United States Patent [19]
Kent et al.

[11] 3,924,909
[45] Dec. 9, 1975

[54] FIFTH WHEEL

[75] Inventors: John Allen Kent, Rolling Prarie, Ind.; Robert B. Love, Park Forest; Harold Louis Meyer, Deerfield, both of Ill.

[73] Assignee: AMSTED Industries Incorporated, Chicago, Ill.

[22] Filed: Jan. 20, 1975

[21] Appl. No.: 542,261

[52] U.S. Cl................................ 308/136; 280/433
[51] Int. Cl.²........................................ B62D 53/08
[58] Field of Search...................... 308/136; 280/433

[56] References Cited
UNITED STATES PATENTS

| | | | |
|---|---|---|---|
| 3,275,390 | 9/1966 | Franks | 308/136 |
| 3,337,277 | 8/1967 | Arnold | 308/136 |
| 3,427,657 | 2/1969 | Lewallen | 308/136 |
| 3,704,924 | 12/1972 | Lowry | 308/136 |

*Primary Examiner*—Leo Friaglia
*Attorney, Agent, or Firm*—Andrew J. Bootz; Ralph M. Faust; Fred P. Kostka

[57] ABSTRACT

A cover plate adapted to fit over the upper surface of a fifth wheel and substantially conform to the shape of the fifth wheel. Interposed between the upper surface of the fifth wheel and the lower surface of the cover plate is a low friction material. The cover plate and low friction material are allowed to rotate about the king pin center through an angle of approximately 5° each side of center. When turns are negotiated which require greater than 5° of rotation the trailer pivoting continues between the upper surface of the cover plate and the trailer bed plate; minimal or no lubrication is required between this interface. A pivot center is provided to attach the cover plate to the fifth wheel and hold it secure when a trailer is not attached.

6 Claims, 5 Drawing Figures

FIFTH WHEEL

BACKGROUND AND SUMMARY OF THE INVENTION

The present invention relates to a fifth wheel construction, and more particularly to a fifth wheel construction for highway tractor-trailer combinations.

Fifth wheel lubrication heretofore has been difficult to maintain. Rocking and turning action between a trailer and fifth wheel squeezes the grease off the fifth wheel surface and renders the steering progressively more difficult as the break away friction between the fifth wheel and the trailer bed plate increases. Steering tires deflect laterally during steering maneuvers and this deflection and relative force increase in proportion to the fifth wheel friction. As the static friction breaks loose, the laterally deflected tires rebound requiring an immediate steering correction. The result is trailer swing and vehicle yawing.

To overcome this difficulty, it has heretofore been proposed that a liner of low friction material be positioned on the fifth wheel plate so that the trailer bed plate may rest on the low friction liner. Such low friction material is customarily soft and easily damaged and scuffed and therefore has a short useful life.

Accordingly, it is an object of the present invention to provide an improved fifth wheel construction which overcomes the above-mentioned difficulties.

A further object of the present invention is to provide an improved fifth wheel construction.

Still another object of the present invention is the provision of a fifth wheel having an improved arrangement utilizing a liner of low friction material.

It has been found that the difficult steering conditions which exist at highway speeds involving highway turns, lane changes and steering corrections within a lane can be improved with reduced break away friction at the fifth wheel. Sharper turns at slower speeds can be made with relative ease even on a non-lubricated fifth wheel if the turn is started with low break away friction of the fifth wheel.

In accordance with the present invention a cover plate is provided which is attached to fit over the upper surface of a fifth wheel and substantially conform to the shape of the fifth wheel. A liner of low friction material is interposed between the upper surface of the fifth wheel plate and the lower surface of the cover plate. In accordance with one embodiment of the invention the cover plate rotates relative to the king pin center through an angle of approximately 5° on each side of center, the relative rotation occurring through the low friction liner. When turns are negotiated which require greater than 5° of rotation the trailer pivoting continues between the upper surface of the cover plate and the trailer bed plate; minimal or no lubrication is required between this interface.

Advantageously, the cover plate is returned to a near center position when the semi-combination executes a series of maneuvers and is then brought to a stop. This is apparently due to the nature of tracking of a semi-trailer behind a tractor. Since the rear wheels of the trailer are being towed, it is necessary during normal operation to over-steer the tractor to bring the trailer into a desired alignment. It is not possible to bring the trailer into the same lane as the tractor in a short distance merely by continuing on straight in the lane with a tractor. To overcome this situation, both theoretically and as can be observed in experienced drivers, the drivers will steer to the left bringing the trailer tires more quickly to the desired line of travel, then steer to the right, bringing the tractor back to the same line of travel, then steer slightly to the left now having the combination in line in the desired lane. The corrections in the sequence, each less severe than the preceding one, tend to bring the pivoted cover plate to a centered position when alignment of the tractor and trailer is completed. This would apply to alignment of the plate after any gross steering maneuver, whether it be on the highway or in a terminal yard.

Advantageously, the cover plate protects the solid low friction material during operation and particularly during coupling and uncoupling while allowing normal operation of the fifth wheel. Moreover, the limited rotation of the cover plate on the fifth wheel plate permits coupling and uncoupling without the necessity of alignment of the king pin slot. So long as a turn is started with low break away friction, gross or sharp turns may be completed even on an unlubricated surface without undue steering difficulty.

Further features of the invention will hereinafter appear.

DESCRIPTION OF THE PREFERRED EMBODIMENT

Figure 1:
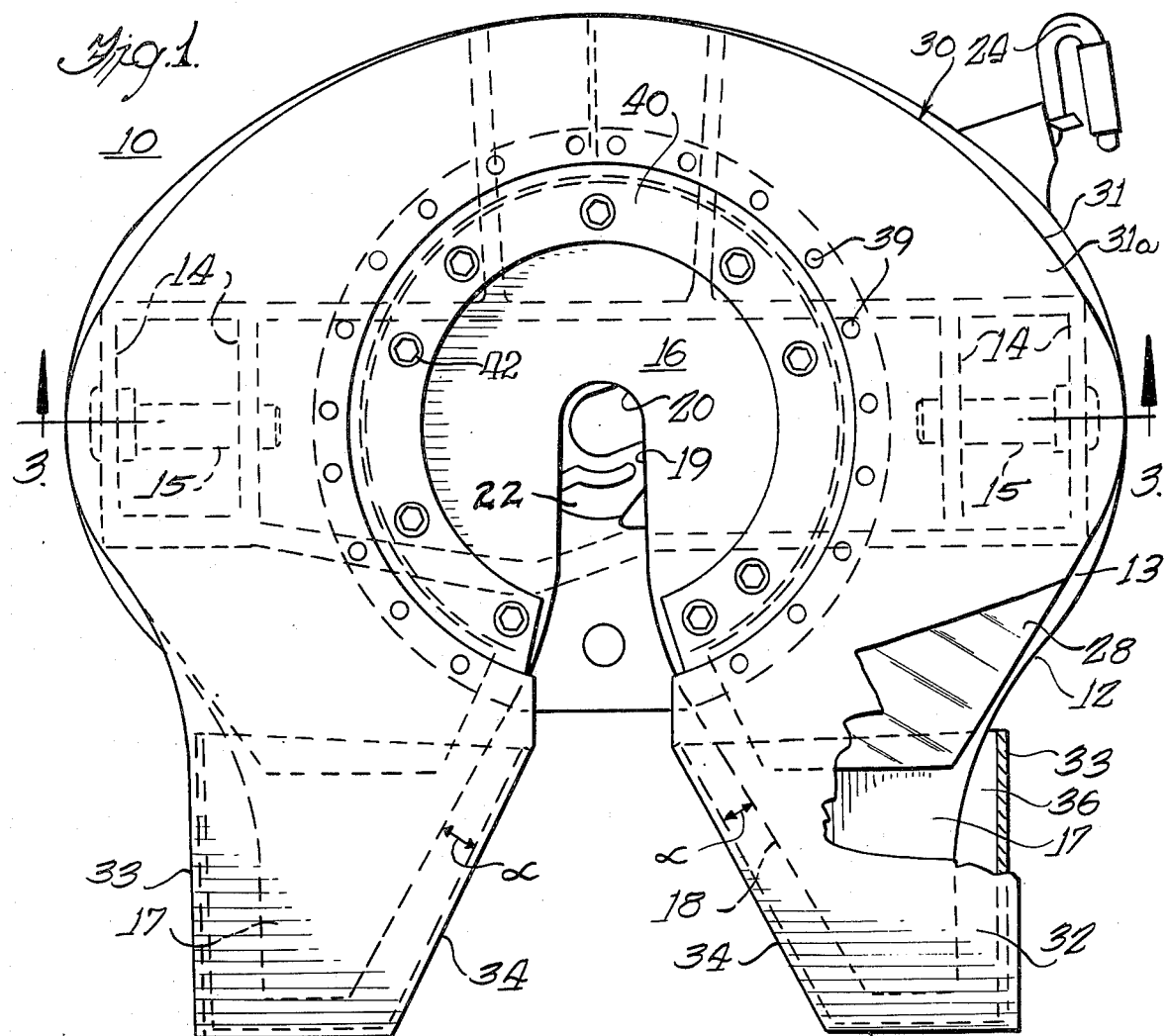
FIG. 1 is a plan view of a fifth wheel assembly according to the present invention.
Figure 2:
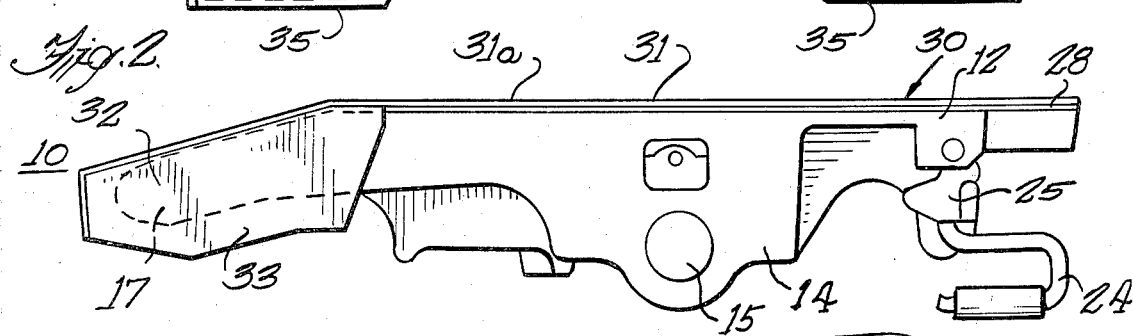
FIG. 2 is a side view of the fifth wheel assembly of FIG. 1.
Figure 3:
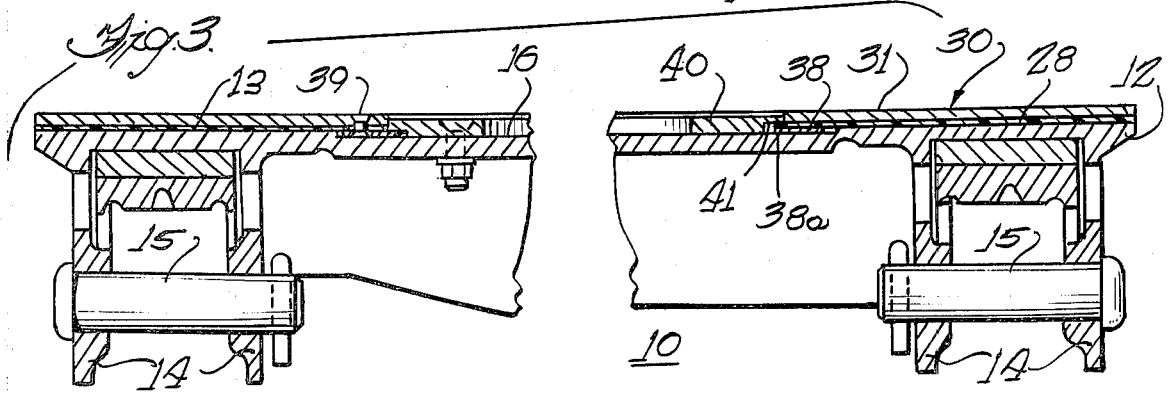
FIG. 3 is a cross-sectional view of the fifth wheel assembly of FIG. 1 taken along line3—3 of FIG. 1.
Figure 4:
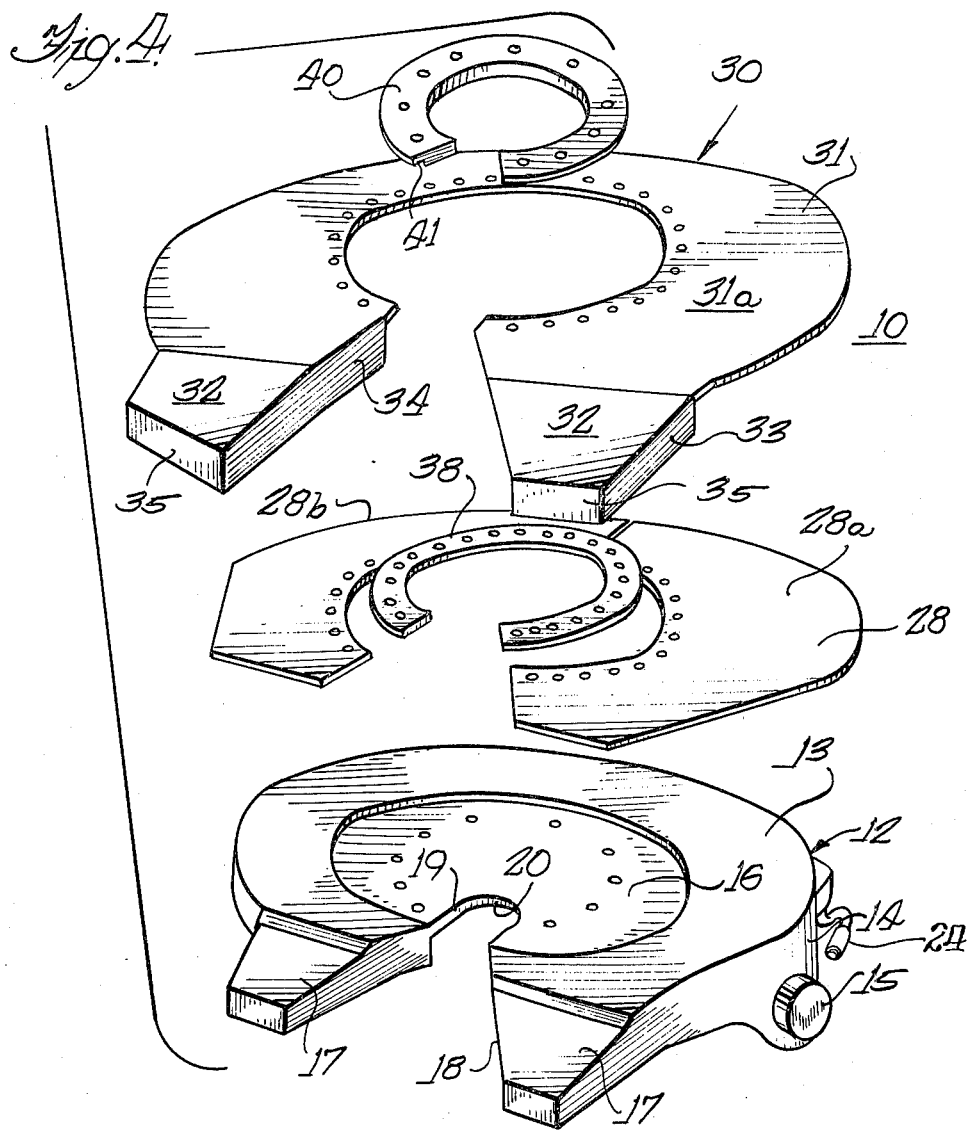
FIG. 4 is an exploded perspective view of the fifth wheel assembly of FIG. 1.
Figure 5:
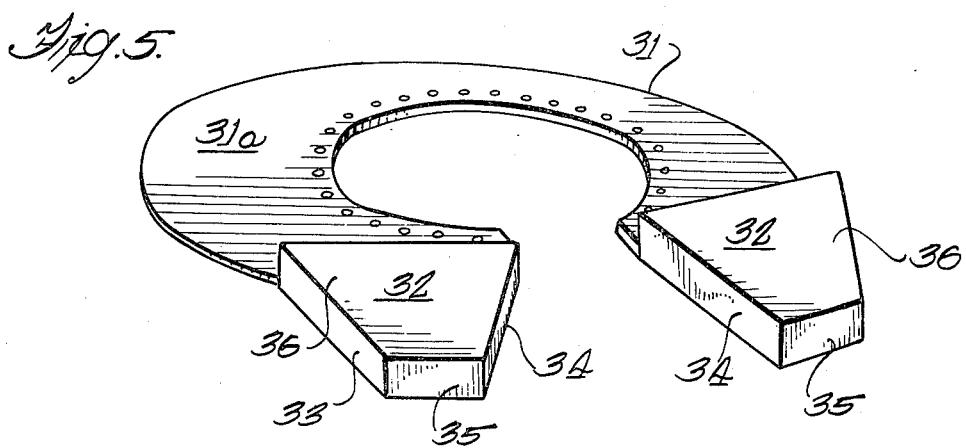
FIG. 5 is a bottom view of the cover plate.

Referring now to the drawings there is illustrated a fifth wheel assembly 10 in accordance with the present invention. The fifth wheel assembly 10 includes a conventional fifth wheel plate 12 having a relatively flat upper surface 13 and a recessed central portion 16. A pair of spaced downwardly extending projections 14 are provided on the underside of the fifth wheel plate for receiving a suitable journal pin 15 for mounting of the fifth wheel plate. The fifth wheel plate 12 is provided with a pair of rearwardly extending downwardly sloping fingers 17 which together define a forwardly converging tapered guideway 18 terminating in a king pin slot 19 and extending into the center of the fifth wheel plate to define a king pin center or receiver 20. Clamping means such as a jaw 22 is provided for locking the king pin of the trailer in the king pin center 20 of the fifth wheel assembly. A conventional operating mechanism including an operating lever 24 is provided for opening and closing the jaw 22. In the illustrated embodiment a safety latch 25 prevents accidental release of the operating lever 24.

A thin liner 28 of low friction material is seated on the flat upper surface 13 of the fifth wheel plate 12. The liner 28 conforms substantially to the shape of the fifth wheel and in the illustrated embodiment is segmented of two pieces 28a, 28b. The liner 28 may be of any suitable low friction material such as that marketed under the trade name NYLATRON.

In accordance with the present invention the liner 28 is protected by a cover plate 31 assembled with the liner 28 to define a cover plate assembly 30. The cover plate 31 fits over the upper surface of the fifth wheel covering the liner 28 and conforms substantially to the outer shape of the fifth wheel plate 12. In the illustrated embodiment the cover plate 31 includes a generally flat portion 31a and a pair of rearwardly extending weldments 32 of generally fabricated box shape each having outer downwardly extending flanges 33 and inner downwardly extending flanges 34. In addition the rearward end of the weldments 32 are closed by end flanges 35 and bottom plates 36 are attached to the lower edges of the flanges 33, 34 and 35. The flanges and bottom plate define a generally box shaped structure open at its forward end and fitted over the rearwardly extending fingers 17 of the rear wheel assembly.

The liner 28 is held assembled to the cover plate 31 by a retaining ring 38 below the liner 28 secured together by a plurality of fasteners 39 to form an integral assembly. The retaining ring fits within the recessed central portion 16 of the fifth wheel plate 12. A retainer or pivot center 40 is provided to attach the cover plate assembly 30 to the fifth wheel and to hold it secure for a bob tail operation (tractor traveling without trailer). As illustrated the pivot center 40 is of arcuate shape having a recess 41 in its lower outer surface fitting over an inwardly extending projection 38a of the retaining ring 38. The retainer 40 is positioned in the recessed central portion and is fixedly secured to the fifth wheel by a plurality of fasteners 42. The cover assembly 30 including the cover plate 31, liner 28 and retaining ring 38 are freely rotatable relative to the pivot center 40 and fifth wheel plate 12.

The liner flange 34 of the cover plate 31 serves as a stop to limit the angular rotation of the cover plate assembly 30 relative to the fifth wheel assembly. As best illustrated in FIG. 1, the cover plate assembly 30 can rotate on the fifth wheel plate 12 through an angle α in either direction until an inner flange 34 strikes the adjacent inner surface of the guideway 18. In the illustrated embodiment of the invention the angle α was approximately 5° permitting a rotation of approximately 5° to each side of center. Although it has been found that the cover plate assembly will center itself upon completion of a maneuver, centering springs may be added to bias the pivoting plate assembly toward center.

It should be understood that the arrangement described above constitutes the preferred embodiment and that many adaptations and modifications may be made without departing from the spirit of the invention. What is claimed is:

1. In combination, a fifth wheel for a trailer truck having a fifth wheel plate, a liner of low friction material riding on the fifth wheel plate, and a cover plate assembled over said liner, said cover plate being pivotally mounted on said fifth wheel plate.

2. The combination according to claim 1 wherein stop means are provided limiting the rotational movement of said pivotally mounted liner and cover plate.

3. The combination according to claim 2 wherein said stops are positioned to limit the rotational movement of said cover plate to about 5° from centered position.

4. In combination: a fifth wheel for a trailer truck including a fifth wheel plate having a flat load bearing surface and rearwardly extending fingers together defining a forwardly converging tapered guideway connecting into a king pin receiver;

a liner of low friction material pivotally riding on said load bearing surface;

a cover plate assembled on said liner substantially conforming to the shape of said fifth wheel plate and including rearwardly extending finger portions; and stop means operatively associated with one of said plates limiting the relative rotational movement thereof.

5. The combination according to claim 4 wherein said stop means comprise downwardly extending flanges on at least the finger portions of said cover plate positioned to stop against the fingers of said fifth wheel plate.

6. The combination according to claim 5 wherein said finger portions are positioned to limit the rotational movement of said cover to about 5° from centered position.

* * * * *